O. A. WOOD & R. S. OGILVY.
INDICATING AND RECORDING WEIGHING MECHANISM.
APPLICATION FILED JULY 26, 1917.

1,285,540.

Patented Nov. 19, 1918.
4 SHEETS—SHEET 1.

Inventor
Owen A. Wood
Robert S. Ogilvy
By W. H. Davis & Son
Attorney

O. A. WOOD & R. S. OGILVY.
INDICATING AND RECORDING WEIGHING MECHANISM.
APPLICATION FILED JULY 26, 1917.
1,285,540.
Patented Nov. 19, 1918.
4 SHEETS—SHEET 2.
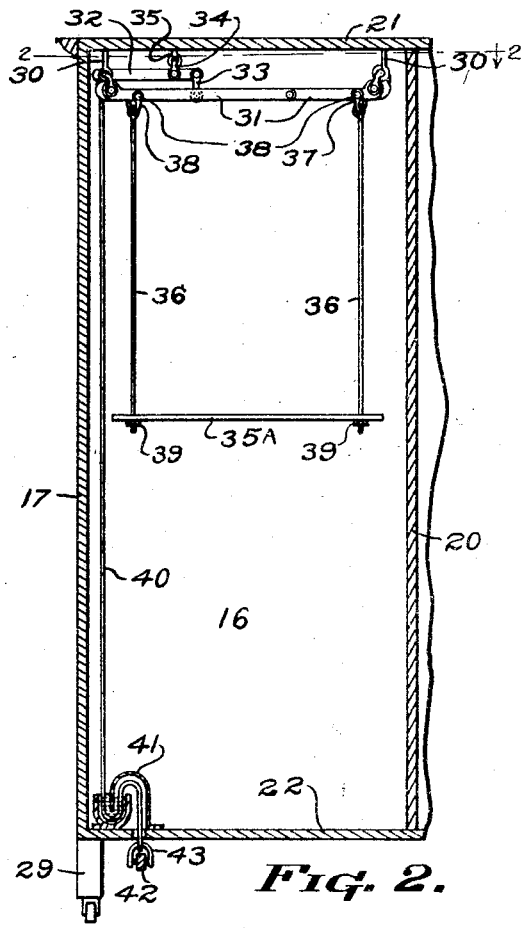
FIG. 2.
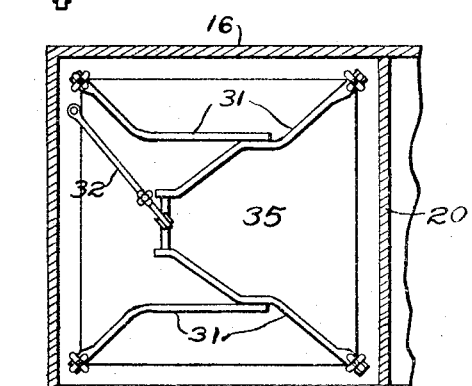
FIG. 3.
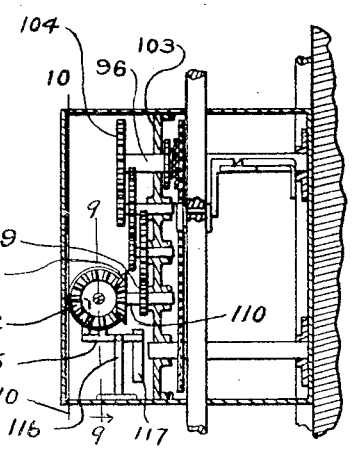
FIG. 9.
FIG. 12.
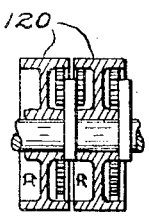
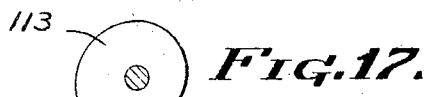
FIG. 17.
Inventor
Owen A. Wood
Robert S. Ogilvy
By W. F. Davis & Son
Attorney O. A. WOOD & R. S. OGILVY.
INDICATING AND RECORDING WEIGHING MECHANISM.
APPLICATION FILED JULY 26, 1917.
1,285,540.
Patented Nov. 19, 1918.
4 SHEETS—SHEET 3.
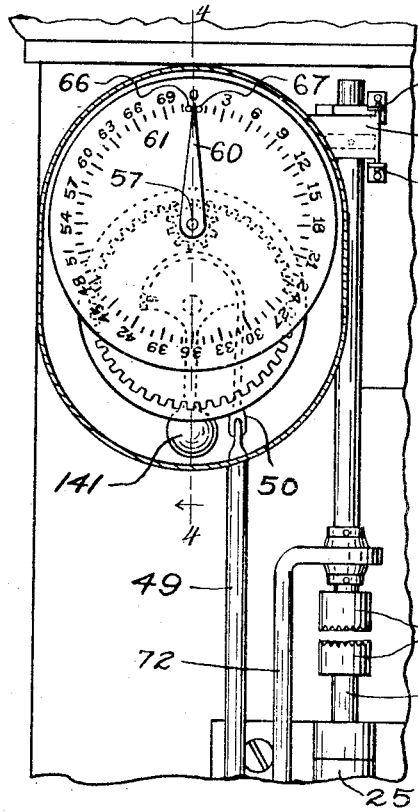
FIG. 4.
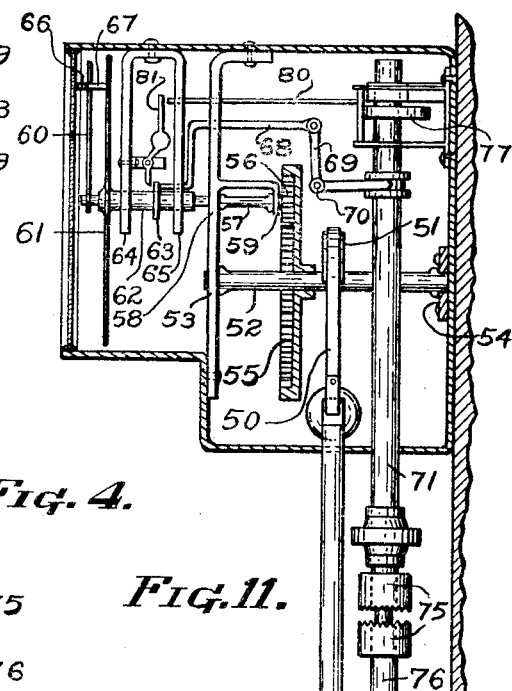
FIG. 11.
FIG. 15.
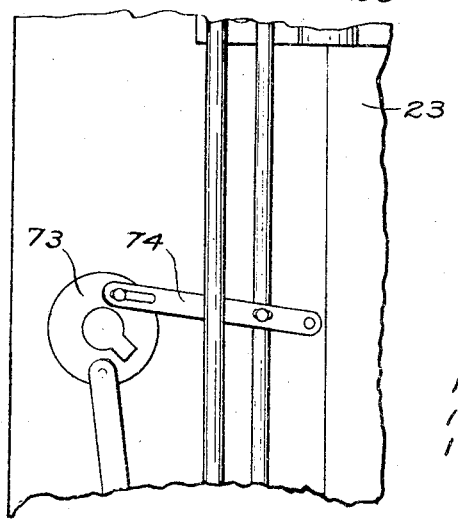
FIG. 5.
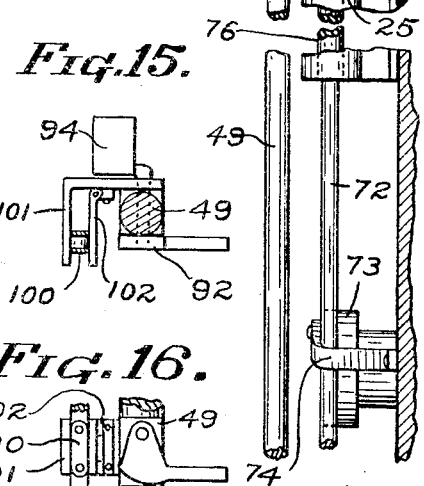
FIG. 16.
Inventors
Owen A. Wood.
Robert S. Ogilvy.
By W. F. Davis & Son
Attorney O. A. WOOD & R. S. OGILVY.
INDICATING AND RECORDING WEIGHING MECHANISM.
APPLICATION FILED JULY 26, 1917.
1,285,540.
Patented Nov. 19, 1918.
4 SHEETS—SHEET 4.
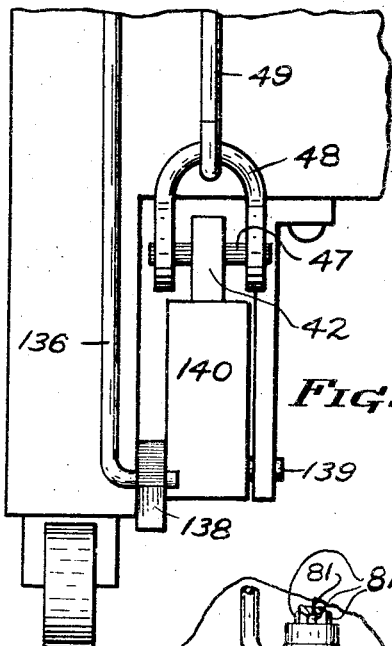
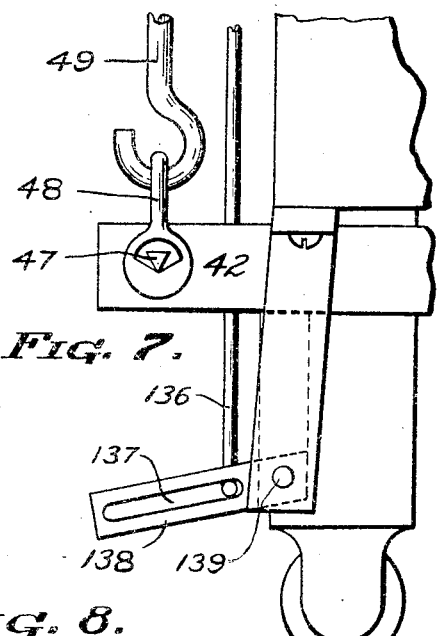
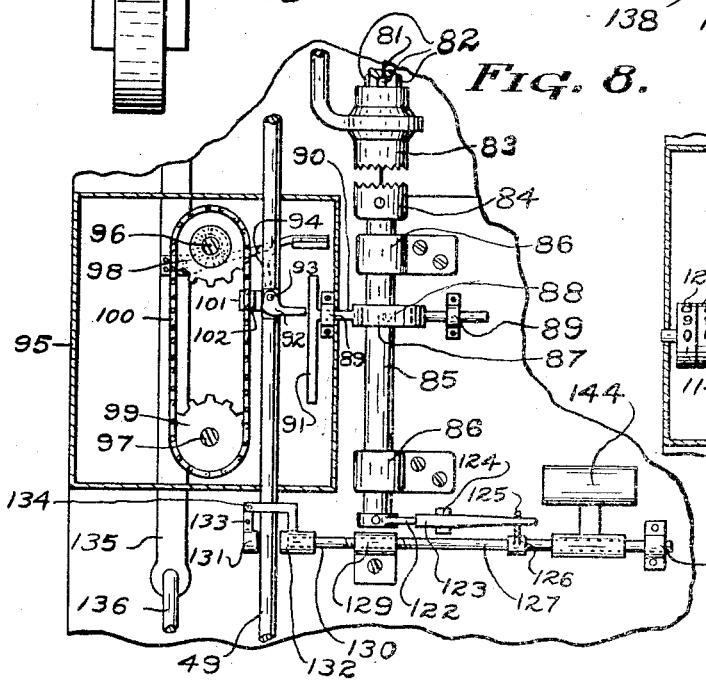
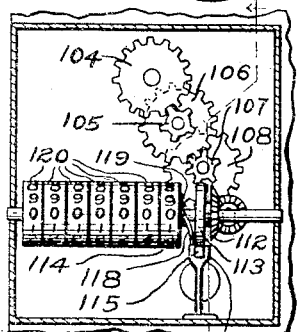
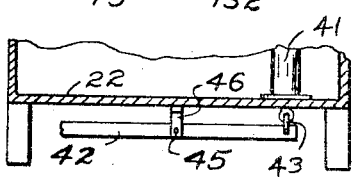
Inventor
Owen A. Wood
Robert S. Ogilvy
By W. F. Davis & Son
Attorney

UNITED STATES PATENT OFFICE.

OWEN A. WOOD, OF MUSKOGEE, OKLAHOMA, AND ROBERT S. OGILVY, OF KANSAS CITY, MISSOURI.

INDICATING AND RECORDING WEIGHING MECHANISM.

1,285,540. Specification of Letters Patent. Patented Nov. 19, 1918.

Application filed July 26, 1917. Serial No. 182,924.

*To all whom it may concern:*

Be it known that we, OWEN A. WOOD and ROBERT S. OGILVY, citizens of the United States, residing at Muskogee, in the county of Muskogee and State of Oklahoma, and at Kansas City, in the county of Jackson and State of Missouri, have invented certain new and useful Improvements in Indicating and Recording Weighing Mechanism, of which the following is a full, clear, and exact description, such as will enable others skilled in the art to which it appertains to make and use the same.

This invention relates to indicating and recording mechanism for weighing apparatus and more particularly to that class installed in refrigerators.

An object of the present invention is to provide an indicator that will remain at zero when weight previously recorded remains on the weighing apparatus, and will indicate only additional weight when placed upon the weighing apparatus and the refrigerator door is closed.

Another object of the present invention is to provide a meter that can be instantly read to record the total amount of weight placed upon the weighing apparatus from time to time.

Another object of the present invention is to connect an indicator and a meter and a weighing apparatus together so that the indicator will indicate weight placed upon the weighing apparatus without indicating weight previously placed thereon, and the meter will record the additional weight together with the total of weights previously placed thereon from time to time.

With these and other objects in view the invention consists in the features, combinations and arrangements of parts hereinafter set forth, illustrated in the accompanying drawings and more particularly pointed out in the appended claims.

In the drawings:—

Fig. 2 is a fragmentary broken view of Fig. 1 illustrating the ordinary weighing scale installed in the refrigerator.

Fig. 3 is a fragmentary sectional view taken on line 2—2 of Fig. 2.

Fig. 4 is an enlarged fragmentary view of the indicator mounted on a fragment of the refrigerator.

Fig. 5 is an enlarged fragmentary view illustrating the lock and levers for locking and unlocking the weighing scale, and engaging and disengaging the clutches.

Fig. 6 is an enlarged fragmentary view of the locking mechanism for locking the scale beam against movement and raising the rod connected thereto upward to bring the dial and indicator into normal or vertical position.

Fig. 7 is a fragmentary side view of Fig. 6.

Fig. 8 is an enlarged fragmentary view illustrating the mechanism for controlling the meter.

Fig. 9 is a fragmentary sectional view illustrating the meter mechanism, and taken on line 1—1 of Fig. 1.

Fig. 10 is a fragmentary view taken on line 10—10 of Fig. 9.

Fig. 11 is a side fragmentary view of Fig. 4, with the inclosing incasement shown in section on line 4—4 of Fig. 4.

Fig. 12 is an enlarged fragmentary sectional view illustrating the manner of turning the various meter disks, taken on line 9—9 of Fig. 9.

Fig. 14 is a fragmentary view illustrating the bottom scale beam still further enlarged.

Fig. 15 is a fragmentary view of the clamping mechanism for grasping and releasing the chain of the meter.

Fig. 16 is a side view of Fig. 15.

Fig. 17 is a sectional view taken on line 10—10 of Fig. 10.

Figure 1:
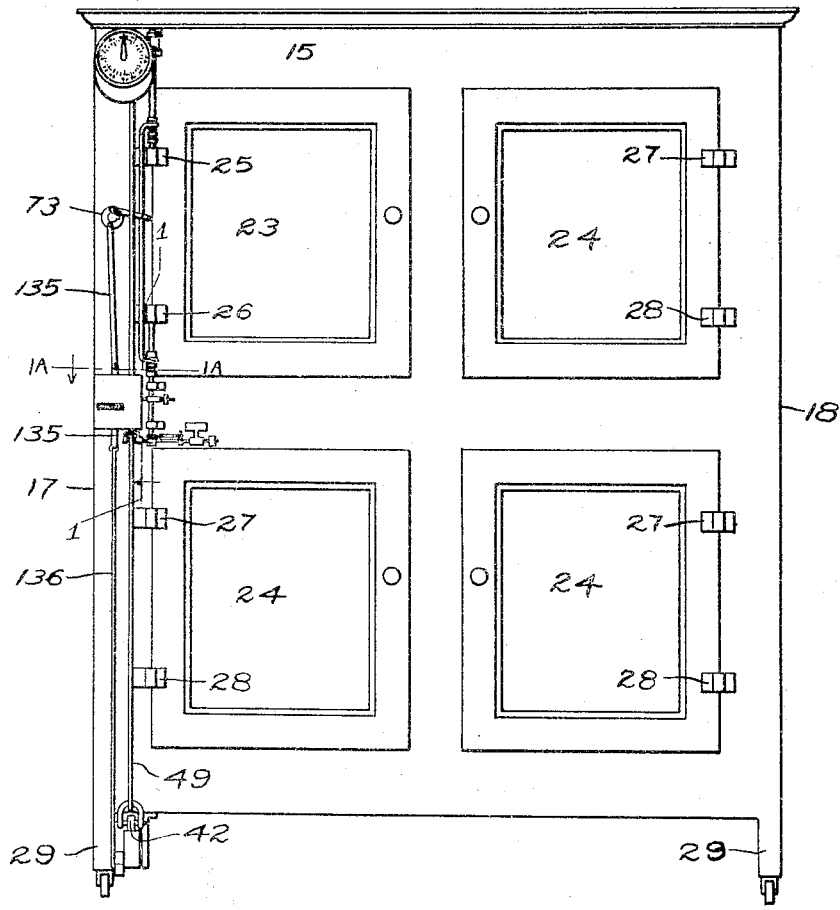
Figure 1 is a view in elevation of a refrigerator provided with the improved indicating and recording mechanism.
Figure 13:
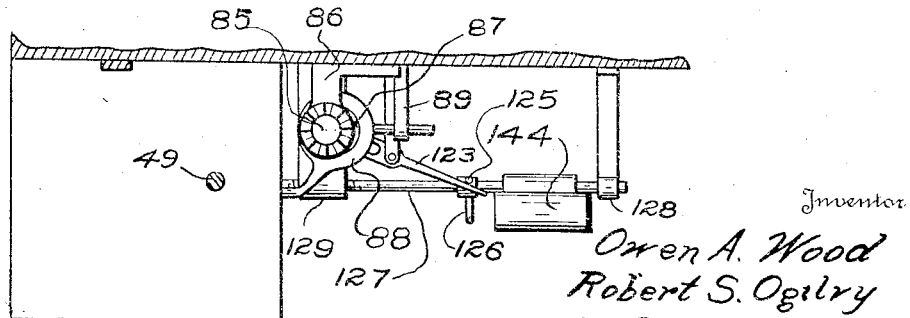
Fig. 13 is a fragmentary sectional view taken on line 1ᴬ—1ᴬ of Fig. 1.

The refrigerator comprises front wall 15, rear wall 16, end walls 17 and 18, division wall 20, cover 21, bottom wall 22, doors 23, 24, hinges 25, 26, 27 and 28, and legs 29, all of which are of common and well known construction.

From the cover depends the eyebolts 30 to which are pivoted in the usual manner the scale levers 31, the lever 32 being pivoted to the levers 31 by link 33 while the lever 32 is fulcrumed on pin 34 secured to eyebolt 35.

The rods 36 are connected to the levers 31 by clevises 37 and pins 38 and depend therefrom. The scale plate 35ᴬ fits around the rods and is supported by nuts 39, forming a bottom wall of the compartment and a receptacle for the ice which is placed thereon but not shown because it is no part of the mechanism.

The lever 32 has depending therefrom the rod 40 which passes through the trap 41 connecting to the lever 42 by the clevis 43, the trap being partly filled with liquid, preferably oil, as shown by the shading lines to prevent warm air from entering the refrigerator around the rod 40.

The lever 42 is fulcrumed on the pin 45 in the bracket 46, while the outer end is pivoted by pin 47 to the clevis 48 to which is connected the rod 49, the latter passing upward and connecting to the belt 50 and secured to the segment 51 mounted on the shaft 52.

The shaft 52 journaled in bearings 53 and 54 has an internal gear 55 tightly mounted thereon to drive the pinion 56 tightly mounted on shaft 57, the latter being supported in journal bearings 58 and 59 and having an indicator 60 tightly mounted on the outer end thereof.

The dial 61 integral with boss 62 and collar 63 is revolubly and slidably mounted in journal bearings 64 and 65, and does not come into contact with shaft 52.

The dial 61 has one long pin 66 and one short pin 67 mounted therein, spaced apart to receive the point of the indicator 60, the pins 66 and 67 being slipped around the edges of the indicator at zero when the dial is moved forward by lever 68, bell crank 69, fulcrumed at 70 and shaft 71. The shaft 71 is raised and lowered by shifting rod 72 and is revolubly mounted therein, the shifting rod 72 being raised and lowered by lock 73 and lever 74.

When the door 23 is opened the lock 73 is thrown in the position to engage the clutch 75, and the shaft 71 is turned through the hinge 25 and shaft 76 tightly mounted in the portion of the hinge secured to the door and turns the cam 77 in a position to press the lever 78 pivoted in bearings 79 in an outward position forcing the rod 80 and upper portion of the pivoted lever 81 outward sliding the dial 61 through the bosses 64 and 65 by collar 63 inward to release the indicator 60 from the short pin 67.

The shaft 81 tightly mounted in the portion of the hinge 26 secured to the door 23 is provided with keys 82 upon which slide the clutch portion 83 adapted to engage clutch portion 84 which is tightly mounted on shaft 85. The shaft 85 is mounted in bearings 86 and has a cam 87 tightly mounted thereon to operate the slide 88 slidably mounted in the bearings 89, the portion 90 of the slide being integral with a vertical plate 91 adapted to trip the cam 92.

The cam 92 is tightly mounted on the pin 93, being journaled in rod 49 and the latter having a weighted balancing lever 94 tightly secured thereon to engage the cam with hinge plate 102 by gravity.

The casing 95 has two shafts 96 and 97, mounted therein, the shaft 96 having sprocket 98 mounted thereon while the shaft 97 has sprocket 99 mounted thereon. The endless chain 100 is mounted upon the sprockets and adapted to operate between the plates 101 and 102, the plate 101 tightly secured to the rod 49 and having the plate 102 hinged thereto.

The shaft 96 journaled in and passing through wall 103 has a gear 104 mounted thereon and engaging the pinions and gears 105, 106, 107 and 108 all journaled in the wall 103, the gear 108 engaging the pinion 109 mounted upon the shaft 110, the latter having a bevel gear 111 mounted thereon to drive the bevel gear 112 integral with cam 113 and revolubly mounted upon the shaft. The cam 113 is arranged to trip the lever 115 pivoted in the bearing 116 and having its opposite end, to that which is tripped, weighted by weight 117. The tripping end of the lever 115 has a pawl 118 to engage the ratchet 119 integral with the disk 114. The disk 114 and each of the disks 120 are arranged so that the one on the right will revolve ten times to one revolution of the disk on the left thereby giving a series of numbers such as arranged in the ordinary speedometers and recording machines, the mechanism between the disks being illustrated but not described in detail for the reason of its common and well known operation, the numbers thereon registering in rotation in slot 121 and the casing 95.

A trip lever 122 mounted on the bottom of the shaft 85 is arranged to swing the lever 123 to and fro, the latter being fulcrumed at 124 and working between the trip pins 125 and 126. The pins are mounted on the shaft 127, which is slidably mounted in bearing 128 and threaded in bearing 129.

The end 130 of the shaft 127 is arranged to close the jaws 131 and 132 on the rod 49. The jaw 131 is fulcrumed at 133 and pivoted to jaw 132 at 134.

The lock 73 has lever 135 pivoted thereto and extending downward and connecting to rod 136, the end of rod 136 bent at right angles to work in the slot 137 of the lever 138 pivoted upon the shaft 139 and integral with the lock 140 arranged to lock the lever 42.

When it is desired to place ice in the refrigerator the lock 73 is turned engaging the clutches 75 and 83 and releasing the lever 42, allowing the rod 49 to be drawn downward in proportion to the weight that rests on the scale, the top of the rod 49 drawing on belt 50 turning segment 51 which is normally balanced by weight 141 and causing internal gear 55 to drive the pinion 56, shaft 57, indicator 60, the indicator carrying the dial around with it by means of the short pin 66.

The door 23 is then opened turning the shafts 71 and 85 through clutches 75 and 83, the upper shaft 71 turning the cam 77 and causing the dial and pin 66 to be drawn from the indicator through rod 80 and pivoted lever 81, the dial being drawn back sufficient to cause the pin 67 to release the indicator.

At the same time the lower shaft 85 will revolve cam 87 and cause the slide 88 to trip the cam 92, the weight 94 causing the cam to turn and engage hinged plates 102 with the chain 100 and plate 101. At the same time the trip 122 will force the weight 144 toward the refrigerator through pin 125 and lock the jaws 132 and 133 on the rod 49 so that the latter cannot be moved. The additional ice is then placed upon the scale.

Door 23 is then closed releasing the jaws 132 and 133 allowing the rod 49 to cause the indicator 60 to revolve around dial until the weight of the additional ice is indicated, at the same time the plates 101 and 102 now gripping the chain 100 through cam 92 will cause the gears in the meter to revolve the numbered disks so that the additional weight will be added to the total to be read through the slot.

The lock is then turned to raise the lever 42 and rod 49 in the upper position so that the indicator will return dial through pin 66, to normal position, the shaft 71 raising upward disengaging the clutches, turning bell crank 69, moving rod 68 outward and pressing the dial forward, the pin 67 again passing around the side of the indicator, the entire mechanism then being at rest or ready for another operation.

Having thus described our invention, what we claim as new, and desire to secure by Letters Patent, is:—

1. In indicating and recording weighing mechanism, a refrigerator, a door connected thereto, an indicator, a scale, connections connecting said indicator and said scale, connections connecting said door and said indicator and automatically controlled by the opening of said door to cause said scale to adjust said indicator to weight previously placed on scale without indicating the weight, said latter mentioned connections arranged to cause said indicator to indicate only the weight of additional weight after it is placed on the scale and said door closed.

2. In indicating and recording weighing mechanism, a refrigerator, a door connected thereto, an indicator, a scale, connections connecting said indicator and said scale, connections connecting said door and said indicator and automatically controlled by the opening of said door to cause said scale to adjust said indicator to weight previously placed on the scale without indicating the weight, said latter mentioned connections arranged to cause said indicator to indicate only the weight of additional weight after it is placed on the scale and said door closed, and a meter connected to said indicator to indicate the total amount of all weight placed on said scale from time to time.

3. In indicating and recording weighing mechanism, a refrigerator, an indicator, a dial, a long and short pin in said dial, said pins normally extending around the sides of the point of said indicator, a scale in said refrigerator, mechanism connecting said scale with said indicator, a door in said refrigerator, mechanism connecting said indicator and said scale and arranged to rotate said dial with said indicator by means of said short pin when weight is on the scale and said door is closed, mechanism connecting said dial with said door and arranged to withdraw said dial and short pin from the indicator when said door is opened, means to lock said mechanism turning said indicator when said door is opened, means to unlock said mechanism turning said indicator when said door is closed, whereby said indicator will turn around said dial and indicate only additional weight.

4. In indicating and recording weighing mechanism, a refrigerator, an indicator, a dial, a long and short pin in said dial, said pins normally extending around the sides of the point of said indicator, a scale in said refrigerator, mechanism connecting said scale with said indicator, a door in said refrigerator, mechanism connecting said indicator and said scale arranged to rotate said dial with said indicator by means of said short pin when weight is on the scale and said door is closed, mechanism connecting said dial with said door arranged to withdraw said dial and short pin from the indicator when said door is opened, means to lock said mechanism turning said indicator when said door is opened, means to unlock said mechanism turning said indicator when said door is closed, whereby said indicator will turn around said dial and indicate only additional weight, mechanism to return said dial and said indicator to normal position by means of said long pin, and mechanism to thrust said short pin around the side of said indicator.

5. In indicating and recording weighing mechanism, a refrigerator, a door hingedly connected to said refrigerator, a scale in said refrigerator, a meter connected to said refrigerator, a beam lever connected to said scale and movable with the weight on said scale, a rod extending from said beam lever and adjacent said meter, gripping means, means for connecting and disconnecting said gripping means and said door whereby said gripping means may be operated at will by the opening of said door and arranged to grip said rod and hold said lever from moving with the weight placed on said scale, said gripping means disengaged by the closing of said door, said connecting means including a shaft mounted adjacent said door, means to rotatively engage and disengage said shaft and said door, said rotatively engaging means operatable by the turning of a key, and means whereby said meter is operated when said rod is disengaged as said door is closed.

6. In indicating and recording mechanism, a refrigerator, a door on said refrigerator, a scale in said refrigerator, a meter connected to said refrigerator, a rod movable with and proportionally to the weight carried by said scale, means whereby said rod is locked by the opening and closing of said door against movement while said door is opened and free to move with and according to weight on said scale when said door is closed, means connecting said rod and said meter whereby said meter is caused to register the weight on said scale, means for effecting said connections from said door as said door is closed, and means whereby said scale may be locked by the opening and closing of said door so that said rod and said meter will not operate.

7. In indicating and recording mechanism, a refrigerator, a scale in said refrigerator, a door opening and closing access to said scales, a meter mounted on said refrigerator, means to lock said scale so that said meter will not be operated thereby when the door is opened and closed, means to unlock said scale so that as said door is opened said scale is automatically locked and as said door is closed said scale is automatically unlocked, and means whereby said meter is operated when said door is closed so that weight placed on said scale while said door is open will be registered as said door is closed.

OWEN A. WOOD.
ROBERT S. OGILVY.

Copies of this patent may be obtained for five cents each, by addressing the "Commissioner of Patents, Washington, D. C."